3,170,835
NITROMETHYLBENZYL - PHOSPHOROTHIOIC
ACID DIESTERS AND NEMATOCIDAL
METHODS EMPLOYING SAME
Kenneth L. Godfrey, St. Albans, W. Va., assignor to
Monsanto Company, a corporation of Delaware
No Drawing. Filed Apr. 15, 1957, Ser. No. 652,652
6 Claims. (Cl. 167—22)

This invention relates to new phosphorothioates and to nematocidal compositions containing them.

In accordance with this invention it has been found that certain α-(nitromethyl)benzyl phosphorothioates destroy nematodes and other pests. These compounds may be represented by the general formula

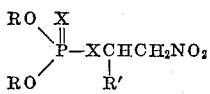

wherein the R's represents the same or different aryl, halogen substituted aryl, nitro substituted aryl, alkyl, alkenyl or alkoxy alkyl radicals, as for example allyl, p-nitrophenyl, phenyl, o-chlorophenyl, 2,4-dichlorophenyl, p-chlorophenyl, 2,4,5-trichlorophenyl, 2,6-dichlorophenyl, tolyl, methyl, ethyl, butyl, isobutyl, isopropyl, propyl, amyl, hexyl, octyl, decyl, undecyl, dodecyl, tridecyl and 2-methoxy ethyl, X represents oxygen or sulfur at least one being sulfur and R' represents a phenyl group, nitro substituted phenyl or chlorosubstituted phenyl, as for example 2-chloro-4-nitrophenyl, 2-nitrophenyl, p-chlorophenyl.

These compounds may be obtained by condensing a thioacid of the formula

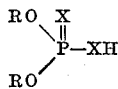

in which the R's have the meaning shown above, with a β-nitrostyrene. The reaction is carried out in the presence of a solvent such as benzene and a catalyst may be used if desired. Triethylamine or choline or both, in small amount, are satisfactory for this purpose. To guard against polymerization a small amount of hydroquinone may also be added to the reaction mixture.

The following examples will further illustrate the invention.

EXAMPLE 1

A mixture of 63.4 grams (0.33 mole) of 98% O,O-diethyl S-hydrogen phosphorodithioate, 150 cc. of benzene, 0.2 gram of hydroquinone, 2 cc. of triethylamine and 2 cc. of choline were charged into a suitable reactor and 49.7 grams (0.33 mole) of β-nitrostyrene added in small portions over a period of 15 minutes. An ice bath was used to keep the temperature under 40° C. during the addition and the mixture was then heated to 50–60° C. for 1 hour. The product was taken up in 100 cc. of benzene, the benzene solution washed with 200 cc. of 3% sodium carbonate followed by two 200 cc. water washes. The solvent was removed under reduced pressure (70° C./5 mm.) and the O,O-diethyl S-[α-(nitromethyl)benzyl] phosphorodithioate remaining was a brown liquid. Analysis gave 8.9% phosphorus and 4.2% nitrogen as compared to 9.2% phosphorus and 4.0% nitrogen calculated for $C_{12}H_{18}NO_4PS_2$.

EXAMPLE 2

To a solution of 56.0 grams (0.2 mole) of 86.5% O,O-dibutyl S-hydrogen phosphorodithioate, 0.2 gram of hydroquinone and 4 drops of triethylamine in 200 ml. of benzene was added portionwise over a period of 10 minutes 29.9 grams (0.2 mole) of β-nitrostyrene. The reaction was exothermic and was controlled under 40° C. by means of an ice bath. After the initial reaction was complete, the mixture was heated at 60° C. for an hour, then washed with sodium carbonate solution followed by two water washes. The solvent was removed under reduced pressure to give O,O-dibutyl S-[α-(nitromethyl) benzyl] phosphorodithioate in 99.7% theory yield. It was an amber liquid analyzing 8.3% phosphorus and 3.6% nitrogen as compared to 7.9% phosphorus and 3.6% nitrogen calculated for $C_{16}H_{26}NO_4PS_2$.

EXAMPLE 3

Proceeding according to Example 2, 51.0 grams (0.2 mole) of 96.5% O,O-bis(2-methoxyethyl) S-hydrogen phosphorodithioate was substituted for the S-hydrogen phosphorodithioate in that example. The O,O-bis(2-methoxyethyl) S-[α - (nitromethyl)benzyl] phosphorodithioate was obtained in theory yield. It was a dark amber liquid analyzing 3.5% nitrogen which is the calculated value for $C_{14}H_{22}NO_6PS_2$.

EXAMPLE 4

In the procedure of Example 2, O,O-bis(2,4-dichlorophenyl) S - [α - (nitrophenyl)benzyl] phosphorodithioate was obtained in 93.5% yield. It analyzed 5.2% phosphorus and 11.0% sulfur as compared to 5.4% phosphorus and 11.3% sulfur calculated for $C_{20}H_{14}Cl_4NO_4PS_2$.

EXAMPLE 5

A mixture of 49.5 grams (0.1 mole) of O,O-bis(tridecyl) S-hydrogen phosphorodithioate, 14.9 grams (0.1 mole) of β-nitrostyrene, 6 drops of triethylamine, 6 drops of choline, 0.2 gram of hydroquinone and 150 ml. of benzene were charged into a suitable reactor and heated for 2 hours at 60–70° C. and finally at refluxing temperature (80–82° C.) for one hour. The solvent was removed under reduced pressure to give O,O-bis(tridecyl) S-[α(nitromethyl)benzyl] phosphorodithioate in 99.8% yield. It was a red liquid analyzing 4.5% phosphorus as compared to 4.8% calculated for $C_{34}H_{62}NO_4PS_2$.

EXAMPLE 6

To a solution of 28.2 grams (0.1 mole) of O,O-diphenyl S-hydrogen phosphorodithioate in 150 ml. of benzene was added portionwise 14.9 grams (0.1 mole) of β-nitrostyrene and the mixture heated slowly to 50° C. The mixture was held at this temperature for one hour and the solvent then removed under reduced pressure (65° C. at 3 mm.). The O,O-diphenyl S-[α-(nitromethyl)benzyl] phosphorodithioate obtained in theory yield was a red-brown product analyzing 7.2% phosphorus and 14.2% sulfur as compared to 7.2% phosphorus and 14.9% sulfur calculated for $C_{20}H_{18}NO_4PS_2$.

To illustrate the nematocidal values of the new compounds a suspension of the nematode *Panagrellus redivivus* in water is prepared and the motility of the organism in the presence of 0.1% of the test material is observed through a microscope after exposure to the chemical. The motility after 2 hours' exposure is recorded in the table. Evaluated in the same test O,O-diethyl S-(α-methylbenzyl) phosphorodithioate gave 100 motility after 2 hours, or no better than the control.

Table I

| Compound: | Motility after 2 hours |
|---|---|
| None | 100 |
| O,O - diethyl S - [α - (nitromethyl)benzyl] phosphorodithioate | 0 |
| O,O-dibutyl S - [α - (nitromethyl)benzyl] phosphorodithioate | 5 |
| O,O - bis(2 - methoxyethyl) S - [α - (nitromethyl)-benzyl] phosphorodithioate | 5 |

In another test, heat sterilized soil is infested with nematodes (Meloidogyne sp.) and different portions treated with solutions containing concentrations of 0.1% and 0.01% by weight of O,O - diethyl S - [α - (nitromethyl)benzyl] phosphorodithioate. After standing for a week, two-week old tomato plants are transplanted in the test soil and also in untreated, heat-sterilized soil. The plants are allowed to grow for two months, then harvested and the roots washed and examined. The results showed no nematode infestation.

In actual usage any of the compounds within the preferred class described may be added to the soil in solution, as an emulsion or water dispersion, or in a solid formulation wherein the active nematocide is distributed over some dry and permanently free-flowing powder such as the clays, including bentonite and attapulgite, or such materials as talc, diatomaceous earth, fuller's earth, chalk, calcium carbonate and the like. These diluents normally comprise more than 50% up to 98% of the complete formulation and thereby provide a means of more even distribution of the active material over a wider area and in the effective quantities required. These nematocidal compositions will attack the soil phase of the life cycle of nematode parasites which infest animals. Treating barn yards, chicken pens, stables and other infested areas destroys eggs and also infective larvae of many parasites which infest animals. Moreover, the compositions are effective for the control of nematodes in their environment which includes bodies of animals.

In the use as nematocides or soil fumigants the active compound, diluted or undiluted, may be applied to the soil at rates of 10 to 500 pounds per acre. The preferred application for treating soils of average nematode infection will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. The method of destroying nematodes in agricultural soils which comprises contacting the said organisms with a toxic concentration of a phosphorothioate of the formula

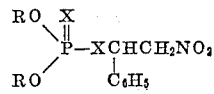

where R is selected from the group consisting of phenyl, toyly chlorine substituted phenyl, p-nitro substituted phenyl alkyl, allyl and a lower alkoxy substituted lower alkyl, X is selected from the group consisting of oxygen and sulfur at least one being sulfur.

2. The method of destroying parasitic worm life which comprises contacting nematodes in their environment with a toxic concentration of an O,O-dialkyl S-[alpha-(nitromethyl)benzyl] phosphorodithioate.

3. The method of destroying parasitic worm life which comprises contacting nematodes in their environment with a toxic concentration of O,O-diethyl[alpha-(nitromethyl)benzyl] phosphorodithioate.

4. A phosphorodithioate of the formula

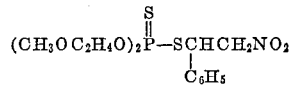

5. A phosphorothioate of the formula

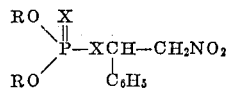

where R is phenyl and X is selected from the group consisting of oxygen and sulfur at least one being sulfur.

6. A phosphorodithioate of the formula

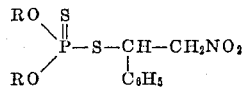

where R is 2,4-dichlorophenyl.

References Cited in the file of this patent

UNITED STATES PATENTS

| | | |
|---|---|---|
| 2,177,757 | Vanderbilt | Oct. 31, 1939 |
| 2,266,514 | Romieux et al. | Dec. 16, 1941 |
| 2,494,283 | Cassaday et al. | Jan. 10, 1950 |
| 2,506,344 | Cleary | May 2, 1950 |
| 2,526,179 | West | Oct. 17, 1950 |
| 2,632,020 | Hoegberg | Mar. 17, 1953 |
| 2,679,508 | Gysin | May 25, 1954 |
| 2,724,719 | Markley et al. | Nov. 22, 1955 |
| 2,758,954 | Tidwell | Aug. 14, 1956 |
| 2,789,124 | Gilbert et al. | Apr. 16, 1957 |
| 2,802,856 | Norman et al. | Aug. 13, 1957 |
| 2,841,520 | Willard | July 1, 1958 |
| 2,979,522 | Johnston et al. | Apr. 11, 1961 |

FOREIGN PATENTS

| | | |
|---|---|---|
| 257,649 | Switzerland | May 2, 1949 |

OTHER REFERENCES

Mel'nikov et al.: "Chem. Abst.," vol. 48, col. 556-7 (1954).

Gar et al.: "Chem. Abst.," vol. 48, col. 6639-40 (1954).

Karabinos et al.: "Chem. Abst.," vol. 47, No. 12, col. 5877 (1953).

Norman et al.: "J. Am. Chem. Soc.," 74, 161-3 (1952).